Nov. 6, 1923. 1,473,336
H. A. CONNELLY
SCENERY TRIMMER
Filed Nov. 11, 1922
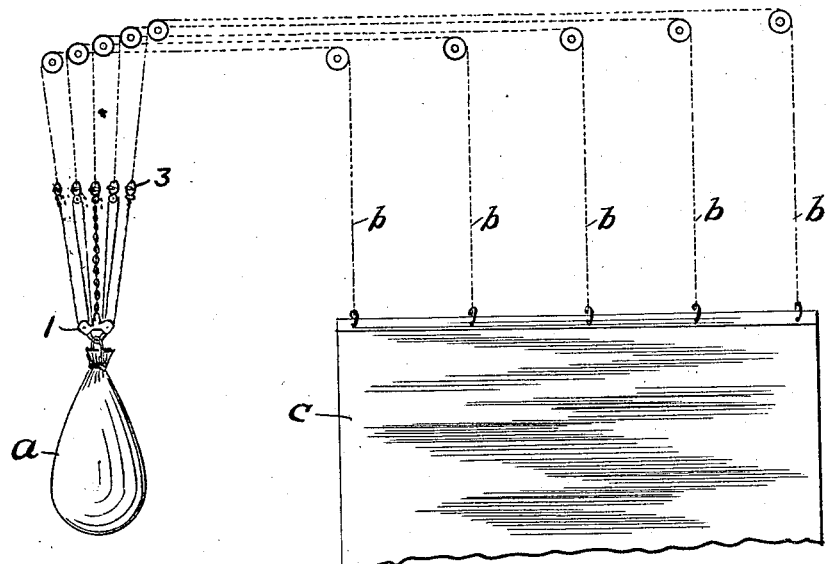
FIG.1.
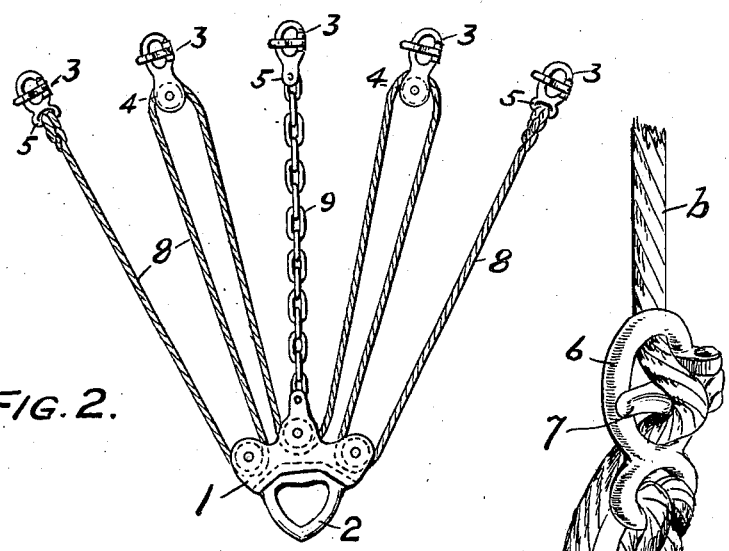
FIG.2.
FIG.3.
WITNESS:
Rob R Kitchel
INVENTOR
Henry A. Connelly
BY
Augustus B Stoughton
ATTORNEY.

Patented Nov. 6, 1923.

1,473,336

UNITED STATES PATENT OFFICE.

HENRY A. CONNELLY, OF PHILADELPHIA, PENNSYLVANIA.

SCENERY TRIMMER.

Application filed November 11, 1922. Serial No. 600,235.

*To all whom it may concern:*

Be it known that I, HENRY A. CONNELLY, a citizen of the United States, residing at Philadelphia, in the county of Philadelphia and State of Pennsylvania, have invented a new and useful Improvement in Scenery Trimmers, of which the following is a specification.

The lines by which scenery is suspended are usually passed over sheaves and brought together and connected with a counterweight. However, where the lines are brought together if they are not of appropriate lengths the scenery will not hang correctly and it is a difficult matter to trim it.

The principal object of the present invention is to provide a scenery trimmer adapted for successful and interchangeable use with five or even four or three scenery lines and hence especially adapted to meet the requirements of traveling shows. Another object of the invention is to facilitate the application and use of the trimmer. Other objects of the invention will appear from the following description.

The invention will be claimed at the end hereof but will be first described in connection with the embodiment of it chosen for illustration in the accompanying drawings forming part hereof and in which Figure 1 is a generally diagrammatic view illustrating features of the invention.

Fig. 2 is a view of the trimmer, and

Fig. 3 is a perspective view drawn to an enlarged scale and illustrating features of the invention.

In the drawings 1 is a three-pulley multiple block having counterweight attaching provisions 2 shown as consisting of a ring or loop to which the counterweight *a* is attached. 3 are a series of five scenery line couplings arranged in spaced relation with the block 1 and of which two are provided with single blocks 4, and of which the other three are provided with dead-eyes 5. As shown the couplings are provided with clamps for the scenery lines *b*, and the clamps consist of openings or loops 6 bridged by hinged tongues 7. With the tongue open a bight of the line *b* can be passed through the loop 6 and over the tongue 7 and in that way conveniently secured to the coupling. 8 is a rope or cable reeved through the blocks 1 and 4 with its ends attached to the center of the dead-eyes 5. 9 is a second rope or chain attached to the block 1 and to the fifth one of the couplings i. e. the center dead-eye.

There are shown five scenery lines of which one is attached to each coupling 3, but usually fewer than five scenery lines are employed and in that case the chain 9 and its coupling may be put into the counterweight *a* which is usually a sand bag, or else connected in slack relation to one of the lines *b* in which case it provides an element of safety in case the cable 8 should break because it would prevent the entire scene *c* from falling. In cases where there are but three scenery lines, one of the clamps that is provided with a block is dispensed with and the cable 8 is arranged through the outside pulleys of the block 1 and through the pulley of the remaining coupling 3, and the chain 9 can be utilized as above described. Evidently the described relations of the parts of the trimmer permit the scene *c* to come to level position automatically upon striking the floor of the stage, the cable 8 working through the blocks for that purpose.

It will be obvious to those skilled in the art to which the invention relates that modifications may be made in details of construction and arrangement without departing from the spirit of the invention, hence the invention is not limited to those matters or otherwise than as the prior art and the appended claim may require.

I claim:

A scenery trimmer adapted for use with three, four and five line sets and comprising the combination of a three-pulley multiple block having counterweight provisions, a series of five scenery line couplings arranged in spaced relation with the block and of which two are provided with single blocks and of which the other three are provided with dead-eyes, a rope or cable reeved through said blocks with its ends attached to two of the dead-eyes, and a second cable attached to the center of the multiple block and to the fifth dead-eye.

HENRY A. CONNELLY.